United States Patent [19]

Brembilla et al.

[11] Patent Number: 5,048,268
[45] Date of Patent: Sep. 17, 1991

[54] VACUUM PACKAGING METHOD AND APPARATUS

[75] Inventors: Sandro Brembilla, Arese; Mario Romani, Passirana di Rho, both of Italy

[73] Assignee: W. R. Grace & Co.-Conn., Duncan, S.C.

[21] Appl. No.: 525,502

[22] Filed: May 17, 1990

[30] Foreign Application Priority Data

Aug. 29, 1989 [GB] United Kingdom ............... 8919523

[51] Int. Cl.⁵ .................... B65B 47/02; B65B 31/00
[52] U.S. Cl. .................................. 53/511; 53/556; 53/559; 226/173
[58] Field of Search .............. 53/89, 141, 282, 389, 53/427, 433, 442, 450, 453, 511, 553, 559, 579, 441, 556; 226/173

[56] References Cited

U.S. PATENT DOCUMENTS

| | | | |
|---|---|---|---|
| 2,597,041 | 5/1952 | Stokes | 53/556 X |
| 3,093,530 | 6/1963 | Lippman | 53/555 X |
| 3,129,545 | 4/1964 | Sloan et al. | 53/511 |
| 3,673,760 | 7/1972 | Canamero et al. | 53/22 |
| 3,857,222 | 12/1974 | Grebe | 53/511 |
| 3,972,155 | 8/1976 | Mahaffy et al. | 53/427 X |
| 4,034,536 | 7/1977 | Mahaffy et al. | 53/433 |
| 4,168,598 | 9/1979 | Omori | 53/433 |
| 4,201,030 | 5/1980 | Mahaffy et al. | 53/432 |
| 4,308,711 | 1/1982 | Mahaffy et al. | 53/511 |
| 4,397,411 | 8/1983 | Vetter et al. | 226/173 |
| 4,624,099 | 11/1986 | Harder | 53/282 X |
| 4,796,408 | 1/1989 | Mobark | 53/556 X |
| 4,826,065 | 5/1989 | Natterer et al. | 226/173 |
| 4,897,985 | 2/1990 | Buchko et al. | 53/559 |

FOREIGN PATENT DOCUMENTS

| | | |
|---|---|---|
| 0138172 | 4/1985 | European Pat. Off. . |
| 0270208 | 6/1988 | European Pat. Off. . |
| 2226456 | 12/1972 | Fed. Rep. of Germany . |
| 2327286 | 12/1973 | Fed. Rep. of Germany . |
| 2322943 | 11/1974 | Fed. Rep. of Germany . |
| 2335021 | 1/1975 | Fed. Rep. of Germany . |
| 2430497 | 1/1976 | Fed. Rep. of Germany . |
| 2437124 | 2/1976 | Fed. Rep. of Germany . |
| 3022065 | 12/1981 | Fed. Rep. of Germany . |
| 3315419 | 10/1984 | Fed. Rep. of Germany . |
| 3318995 | 11/1984 | Fed. Rep. of Germany . |
| 3400911 | 7/1985 | Fed. Rep. of Germany . |
| 3520499 | 1/1987 | Fed. Rep. of Germany . |
| 1352478 | 5/1974 | United Kingdom . |
| 1433188 | 4/1976 | United Kingdom . |
| 1445285 | 8/1976 | United Kingdom . |

Primary Examiner—John Sipos
Attorney, Agent, or Firm—John J. Toney; William D. Lee, Jr.; Mark B. Quatt

[57] ABSTRACT

A packaging method and apparatus employ (i) a thermoforming station 6 through which a support film web 4 is advanced by means of an endless chain carrying clamps 16, followed by (ii) a loading station in which product articles are inserted into the trays formed by the thermoforming station, and (iii) a film-combining station II at which a covering film 3 is stretched longitudinally and then applied in its stretched configuration to the support web 4 (with or without the above-mentioned thermoformed trays) and is clamped thereto for subsequent vacuum skin packaging of the product articles between the support web 4 and the upper film 3. The resulting vacuum skin packs from such a process and apparatus are wrinkle free whereas the conventional vacuum skin packs exhibit longitudinal wrinkling in the covering film.

9 Claims, 3 Drawing Sheets

VACUUM PACKAGING METHOD AND APPARATUS

The present invention relates to a method of packaging, and to apparatus for carrying out that method.

Packaging processes have long been known in which products are placed on a support web of plastics material and a second covering film is then sealed to the perimeter of the support to enclose the product within either a vacuum environment or an inert gas atmosphere.

The support web is usually fed in the form of a continuous web which is only severed in to individual pack-sized sheets after the loading and closing of the pack, i.e. after product articles have been placed on that support web and a covering film has been laid thereover and sealed to the support web.

It is known to guide the support web to the packaging station using a pair of endless chains, each running alongside a respective margin of the path of the support web, and carrying a plurality of clamps which grip the margins of the support web to entrain it for forward movement and to guide it against lateral displacement. Such chains are conventionally used on thermoforming equipment where the support web starts as a flat thermoformable web and is then gripped by the clamp chains, carried to and through a thermoforming station where a pocket or tray is formed in the support web at a location where it will receive one or more product articles, and then the thermoformed support web with its trays or pockets is advanced by the clamp chains to a loading station to receive the product(s), and then advanced to the covering station where a covering web is applied thereto, and then taken onward to a sealing station where the two films are sealed together, either after the extraction of air from between them so as to provide a vacuum thermoformed pack or after injection of an insert gas atmosphere to provide an inert gas thermoformed pack.

With such machines where the support web is clamped satisfactorily during its movement through the various operations of a packaging machine which may or may not include a thermoforming station, whereas the support web is adequately guided by the clamp chains the covering film remains unsupported and is subject to undesirable lateral shifting which might, in the extreme case, provide an unsealed pack at the delivery end of the machine.

It is an aim of the present invention to provide some means of controlling the covering film with the level of precision which has previously been attained with the use of clamp chains for the support web, thereby preventing lateral contraction or lateral shifting of the covering film to an extent which could interfere with the packaging process.

Accordingly, one aspect of the present invention provides a packaging apparatus comprising means for advancing a first film web along a path including in sequence (i) a loading station at which at least one product is placed on the first film web, (ii) a film covering station at which a second film web is placed over the first film web and over product(s) placed having been thereon at the loading station, and (iii) a packaging station at which the first and second film webs are sealed together to define a package with the product(s) loaded at the loading station enclosed within the pack; wherein said advancing means comprise: clamping means for gripping the margins of said first film web and for entraining its advance through said loading station, said film covering station, and said packaging station; and means for opening the jaws of said clamping means at said film covering station to release the margins of said first film web and to provide space for access of a said second film web to said clamping means; and including means for closing said jaws of the clamping means to hold said second film web in juxtaposition with said first film web by clamping of their margins as the clamping means advance from said film covering station.

Preferably the packaging apparatus includes a thermoforming station upstream of the film covering station.

More preferably the packaging station comprises a vacuum skin packaging (VSP) station.

The apparatus of the present invention has applicability in various different processes, and is particularly applicable to a VSP process such as that disclosed in EP-A-0270208.

In the process and apparatus disclosed in EP-A-0270208, the support web is advanced along a machine table by means of a chain of clamps which grip it and advance it through various stages comprising: an optional thermoforming station where the support web may be shaped into a succession of trays, a loading station where product articles are placed on the support web, a film covering station at which a covering film is placed over the support web, a vacuum skin packaging station at which the covering film is draped under vacuum on to the product and the surrounding support area of the support web to form a vacuum skin pack, and a severing station at which the supports along the support web are separated from one another.

In this prior process, the covering film becomes advanced through the process in the conventional manner by being supplied to the covering station by means of a web guide path from a supply reel, and is then entrained by virtue of the fact that immediately following the covering station the vacuum skin packaging station seals the covering film to the support web which thus entrains the covering film forward through the severing station and draws film from the covering film supply roll. This entrainment is quite satisfactory as a means of advancing the covering film through the various stages which involve it, by virtue of the positive connection between the covering film and the clamp-dragged support web.

We have found that there is a tendency for the vacuum skin pack formed with such a machine to exhibit slight longitudinal wrinkling. It is an aim of the present invention to eliminate such longitudinal wrinkling from the conventional vacuum skin packaging process.

Accordingly, another aspect of the present invention provides a packaging process comprising feeding a first film web with at least one product thereon to a moulding station together with a second film web to be applied thereto, the second film web being subjected to longitudinal stretching tension; clamping the tensioned second film web positively to the first film web before carrying out a vacuum skin packaging operation; and maintaining that clamping throughout the vacuum skin packaging operation in which the second film web is caused to drape into intimate contact with the first film web and the at least one product under the effect of a differential pressure which leaves vacuum immediately surrounding the at least one product and holds the second film web in skin-forming contact therewith.

The term "vacuum skin packaging" is intended to denote a technique in which the product article is intimately enveloped by at least one covering film with the application of vacuum to the interior of the pack, so that the enveloping packaging film is effectively a skin of the product.

In order that the present invention may more readily be understood the following description is given, merely by way of example, reference being made to the accompanying drawings, in which.

Figure 1:
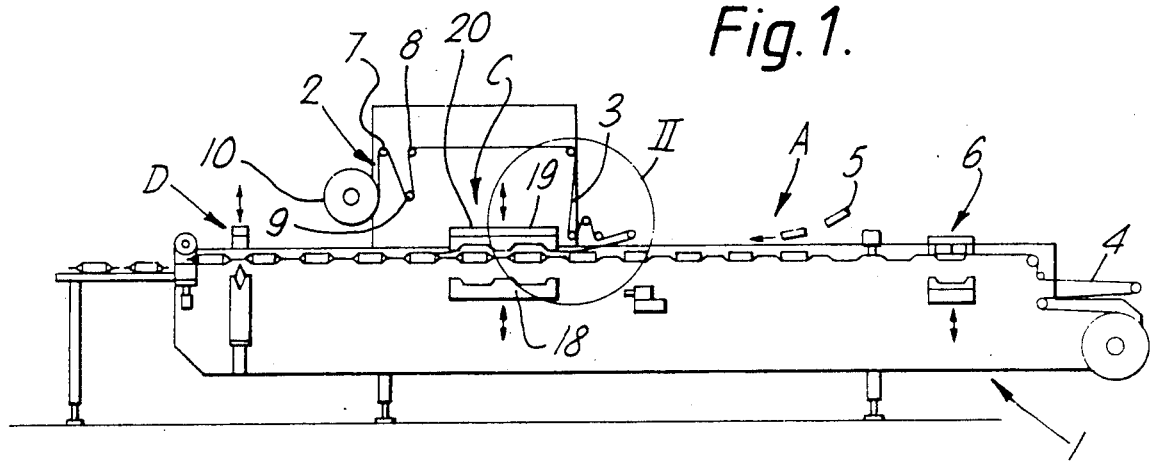
FIG. 1 is a schematic side view of a packaging machine in accordance with the present invention.

Referring now to the drawings, FIG. 1 shows a packaging machine 1 generally similar to that disclosed in EP-A-0270208, with the exception that the schematically illustrated machine generally referenced 1 includes means 2 for tensioning the covering film 3 being applied to the support web 4 just upstream of the VSP station 5.

The VSP station 5 and the upstream thermoforming station 6 are as disclosed in EP-A-0270208 the disclosure of which is therefore incorporated herein by reference. However, very briefly, at the thermoforming station a female thermoforming die to define the tray shape reciprocates in the vertical direction between a raised position in which support web 4, having been heated, is thrust into the female die by differential pressure which may be either suction on the female die or pressure on the overhead male die, or both. When the two dies open the support web 4 is able to be advanced.

Likewise, the VSP station 5 includes two successive upper chamber parts 19 and 20 of different cross section such that the first chamber part 19 defines a less pronounced concavity than that defined by the second chamber part 20, the two chamber parts being heated such that the temperature applied at the first (19) is less than the temperature applied at the second (20) so that the covering film is softened sufficiently at the first cavity-defining chamber part 19 to adopt a partially domed configuration which is then amplified in the second chamber part 20 where a higher temperature is applied to the film in order to give it the required capability of draping on to the product and the tray floor.

Figure 4:
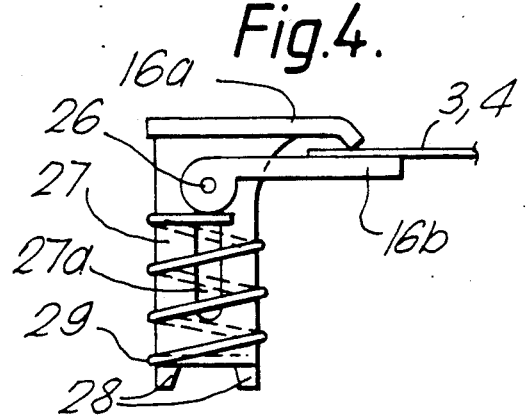
FIGS. 4 and 5 show enlarged views of the clamps of FIG. 3, in the closed configuration in FIG. 4 and in the open configuration in FIG. 5.

In EP-A-0270208 there is mention of film advancing means to advance the tray-defining support web so that the tray 6a of FIG. 4 advances from the first mould chamber portion 12 to the second mould chamber portion 13. This same conventional film advancing means entrains movement of the support web throughout the whole apparatus and in practice this function is provided by an endless chain of clamps 16 (FIG. 2) which hold the support web 4 and draw it along the machine table. Such chains are, for example, disclosed in DE-A-3022065 and DE-A-3315419 and normally open their clamps as they pass round sprockets at the ends of the machine, both to clamp the film at the infeed end and to release it at the delivery end.

In accordance with the present invention the tension-applying means 2 causes the covering film 3 to be stretched longitudinally before it is applied to the support web 4. This tensioning can be obtained by use of a roller system including two horizontally spaced rollers 7 and 8 having between them and beneath them a dancer roll 9 whose position in the vertical direction can be adjusted in order to control the tension on the covering film 3. The supply roll 10 of the covering film 3 is itself braked so as to impose that tension. The vertical movement of the dancer roll 9 simply adjusts the tension imposed, in order that it should be at the desired value and should remain so.

Figure 2:
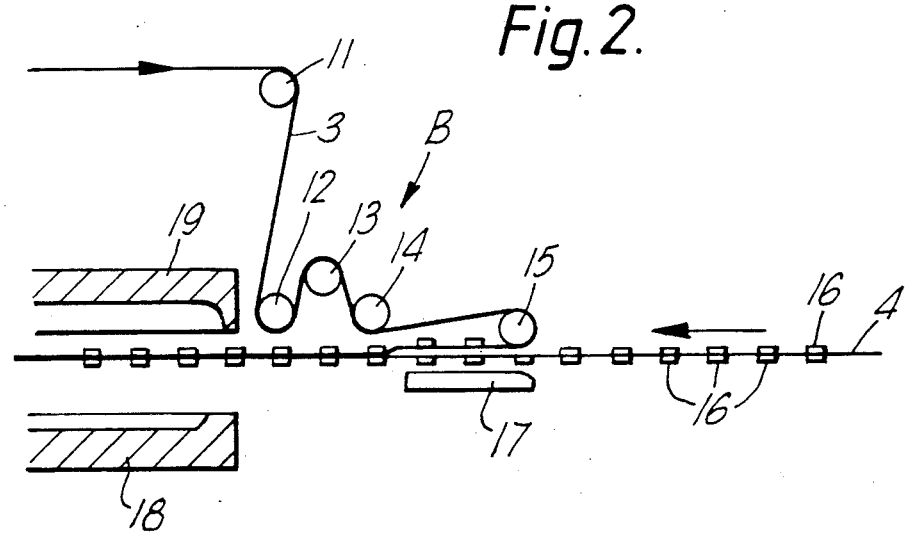
FIG. 2 is a detail of the apparatus shown within the circle II of FIG. 1.

The covering station (the ringed region II of FIG. 1) where the tensioned covering film 3 is applied to the support web 4, is shown in more detail in the side elevational view of FIG. 2 where the various rolls 11, 12, 13, 14 and 15 defining the web path for the covering film 3 are shown as guiding the covering film 3 past the moulds 19, 20 of the VSP station and then bringing it down into close adjacency with the support web 4.

The thus tensioned covering film 3 reverses its direction over the reversing roll 15 and is then moving cocurrent with the support web 4. At this point the longitudinal tension in the covering film 3 has imposed on it a longitudinal stretching which is maintained by the action of the clamps 16 which serve as the film-advancing means for the support web 4.

Figure 5:
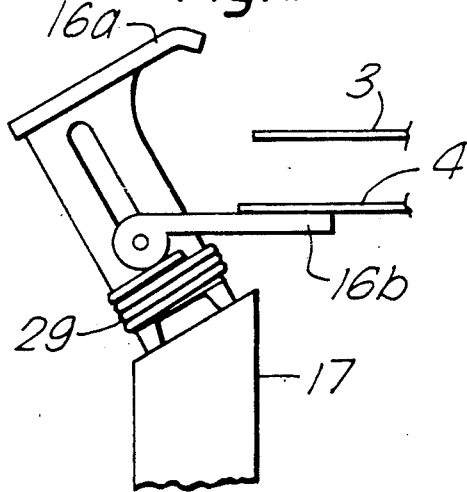

The clamps 16 each include a pivoting top jaw 16a shown closed on to a fixed bottom jaw 16b. For the purposes of explanation, FIG. 4 shows the clamp 16 in the closed configuration clamping both the support web 4 and the covering film 3, whereas FIG. 5 shows the upper clamp jaw 16a raised into a configuration in which it will permit the covering film 3 to descend into contact with the support web 4, for example as occurs at the covering web reversing roller 15 of FIG. 2.

In practice, corresponding clamps at opposite margins of the support web 4 will be in a common configuration, either closed or open.

As shown in DE-A-3022065 and DE-A-3315419, the upper jaw 16a of each clamp 16 is normally spring-loaded to the closed configuration (FIG. 4), but can be raised to the open configuration (FIG. 5) by a cam action at the right hand end of the packaging machine 1, where it will normally first grip the support web 4 either just upstream of, or possibly instead just downstream of, the thermoforming station 6.

Conventionally the clamp springs ensure that the thermoformed support web is clamped throughout its passage along the machine through the VSP station and is then released only when the packages are to be separated for delivery. The forward movement of the covering film 3 results from the sealing frame at the VSP chamber 18, 19 welding the covering film 3 to the margins of the support web 4 and along longitudinally spaced transverse seal lines. This therefore entrains movement of the upper web.

Surprisingly, in the present invention the entrainment of the covering film 3 is by virtue of the same clamps which advance the support web 4. In the illustrated embodiment, the clamps initially close, between the thermoforming station 6 and the covering station II, to advance the trays towards the covering station II and the VSP station 5 and then they open as they pass over a cam plate 17 which acts in a way similar to the cam wheels disclosed in DE-A-3022065 and DE-A-3315419, but at a position intermediate the ends of the machine, to cause the upper jaws 16a to open far enough to allow the covering film 3 to descend on to the support web 4 so that when the movable clamp jaw 16a descends back to the closed configuration (FIG. 4) the margins of the covering film 3 will be clamped together with the margins of the support web 4. While these clamps 16 are open, they are moving along with the rest of the clamps 16 at the same speed and in the same direction. At that time, because the clamps 16 are open, the longitudinally stretched covering film 3 enters the space between the raised movable clamp jaws 16a so that once the clamps, arriving downstream of the plate 17, close under spring action they grip not only the support web 4 of thermoformed tray material but also the covering film 3 thereabove, to hold the longitudinal stretch in the covering film 3 as the support web 4 and the covering film 3 progress through the two-stage moulding process effected in the VSP station 5. The cam plate 17 may, if desired, have its cam tracks arranged oblique to the direction of chain link movement, as in the case of the cam wheel 30 of DE-A-3315419, to enhance the clamp opening action.

Although to some extent the width of the covering film 3 will reduce during the longitudinal stretching between its supply roll 10 and the reversing roll 15, this reduction will be resisted by virtue of the presence of a considerable number of covering web rolls 11, 12, 13, 14 and 15 at that part of the path of the covering film 3. Thus the covering film will be transversely taut as it leaves the reversing roller 15 and becomes laid on the support web 4, to be clamped thereto very soon afterwards as the clamps 16 leave the cam plate 17.

The fact that the covering film 3 is clamped to support web 4 during passage through the VSP station 5 prevents further lateral contraction of the covering film 3 during advance to the vacuum skin packaging process, and also ensures that the longitudinal stretching imposed between the supply roll 10 of the reversing roll 15 is maintained during the early part of the vacuum skin packaging up to the instant when the VSP chamber closes.

As shown in FIG. 1, the VSP station 5 has a vertically movable lower chamber portion 18 which needs to retract downwardly in order to allow the trays to index from the first upper mould 19 to the second more pronounced upper mould 20 where the final pre-heating and draping occurs.

During the second stage of the VSP process the covering film 3 will have been joined to the bottom web 4 so that the finished packs advanced to the severing station 21 are individually sealed.

Figure 3:
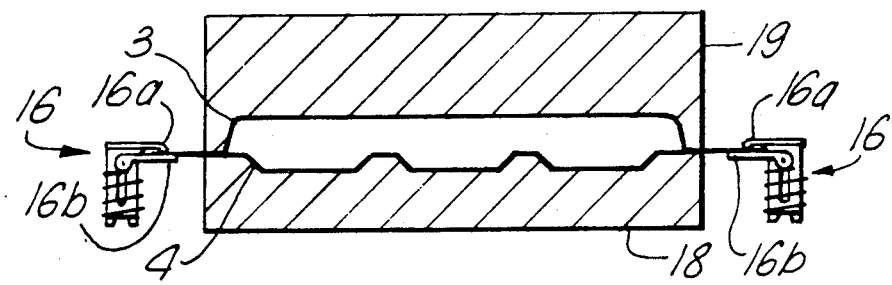
FIG. 3 is a transverse cross-section through the support web and the covering film at the vacuum skin packaging station of FIGS. 1 and 2.
Figure 6A:
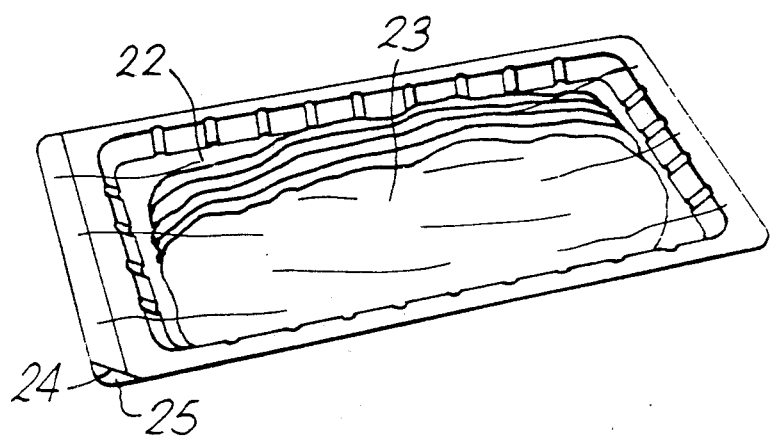
FIGS. 6A and 6B show identical perspective views of, firstly, a conventional pack (FIG. 6A) and, secondly, a pack formed by the method in accordance with the present invention (FIG. 6B).
Figure 6B:
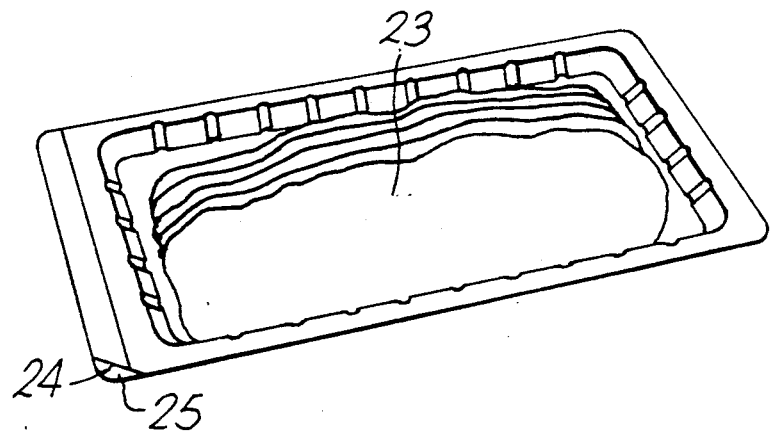

The cross-section shown in FIG. 3 depicts the support web 4 and the covering film 3 during their dwell in the first mould chamber defined between the lower chamber portion 18 and the first upper cavity-forming mould portion 19 defining the less pronounced cavity and heated to a lower temperature than the second upper mould 20. At this stage the two films are separate from one another over the main area of the tray-defining region and the covering film 3 will be clear of the products 23 (FIG. 6A, 6B).

FIG. 3 illustrates that the support web 4 has been thermoformed to define three parallel rows of trays side-by-side. In this case there will of course be a longitudinal slitter which separates the three laterally registered trays from one another after emergence from the VSP station.

Although the above description refers to "a tray" under the first upper mould portion 19 then advancing to the second upper mould portion 20, it will of course be appreciated that this tray may be one of a succession of laterally coincident trays such as the three shown in FIG. 3, and that there may even be a configuration in which two successive rows of such trays are simultaneously located within the first chamber portion 19 and then simultaneously advanced to the second chamber portion 20, provided of course that means are available to apply vacuum uniformly to all of the trays which arrive simultaneously under the second upper mould portion 20 to ensure intimate contact of the covering film with all of the trays around their respective peripheries.

In this case the severing station will in most cases be required to slit transversely along two spaced lines so as to separate the two or more longitudinally associated trays from one another in order to provide individual packs at the delivery station. However, alternatively, it is possible for the trays to be sold in sets of two or three or more and in that case longitudinal slitting may be dispensed with, or the second line of transverse severing may be dispensed with.

FIG. 3 also shows the clamps 16 which are of course closed by the time the covering film 3 and the support web 4 arrive under the first upper mould portion 19.

In order to allow the degree of longitudinal stretching in the covering film 3 to be adjusted, the braking torque on the supply roll 10 can be adjusted by means which will be readily appreciated by the skilled expert. Generally, the degree of stretching is proportional to the width of the film 3, so a change in film width will require a change in braking torque.

Given that the problem to be solved by the present invention is that of preventing longitudinal wrinkling which can readily be seen at 22 in FIG. 6A, we find it surprising that the solution involves longitudinally prestretching the covering film 3. However, having stretched the covering film 3 longitudinally, to preserve biaxial tautness it is important that its width be maintained against any tendency to relax laterally inwardly and to form wrinkles, and for this reason we consider it is an important feature of the present invention that the clamps 16 which traditionally hold only the support web 4 before entering the vacuum skin packaging station also clamp the covering film 3 thereto before such entry.

As shown in FIG. 6A, the relatively shallow product 23 comprising a shingled set of meat slices is visible through the wrinkled covering film 22, whereas the improved pack shown in FIG. 6B allows the same product 23 to be viewed without the wrinkling effect. This more pleasing appearance of the pack is considered as imparting greater customer appeal to the pack.

In the field of food packaging for storage and sale, the appeal to the customer is all-important and thus what may to some be considered to be a minor improvement in the quality of the pack can in this case constitute a significant advantage to the wholesaler and retailer using the method and apparatus in accordance with the present invention.

During the early part of a conventional VSP process the covering film 3 would be capable of sliding both longitudinally and laterally under the transverse and longitudinal (respectively) margins of the upper chamber portion 19 as the covering film becomes drawn upwardly against the heated cavity mould in the upper chamber portion 19. In an extreme case of slippage the covering film 3 could be so far displaced at one or both edges as to allow direct communication between top and bottom halves of the VSP chamber thus preventing proper execution of the VSP process. With the process of the present invention this slippage of the film before the chamber portions 18 and 20 close together to clamp the support web 4 and covering film 3 is prevented. As a result, the film remains relatively taut until its upward deformation on to the heated cavity and is able to drape in a wrinkle-free manner on to the product 23 and the floor and side walls of the tray.

Given that the invention relies upon biaxial tensioning of the film for the VSP process, and that it is preferable for the degree of tensioning along each axis to be the same, it is preferable for the degree of longitudinal stretch to be proportional to the width of the film so that no matter what the width of the film the transverse tensioning resulting from the longitudinal stretch will be matched to the starting width of the film and hence the degree of tensioning will be at an optimum. Clearly, as the film is stretched longitudinally the tendency for it to contract transversely will be proportional to that tension. Provided the degree of contraction can be minimized by the action of the various covering film rollers 11, 12, 13, 14 and 15 as well as by the clamps 16, the tautness of the film in the lateral direction at the start of the VSP process is likely then to be proportional to the degree of longitudinal stretch which is itself held by the fact that the clamps 16 have a constant spacing along the chain (not shown) which supports them.

A particularly suitable film material for use as the covering film is a DARFRESH film which is commercially available from W. R. GRACE & CO.-CONN. Such film is cross-linked before the longitudinal stretching takes place and both has a good tendency to adhere to the stiffer support web 4 and exhibits the desired quality of accommodating without rupture the stretching to which it is subjected by deformation against the hot walls of the upper cavity-defining moulds of the VSP station. DARFRESH is a Trade Mark.

FIGS. 6A and 6B show a diagonal cross cut 24 at one corner of the tray, to define a severed tab 25 to which the covering film 22 is sealed. This tab thus forces an "easy-open" feature in that the tab 25 and attached covering film can be grasped and raised in order to initiate delamination of the covering film 22 from the rim of the tray 4 to open the pack.

As can be seen in FIGS. 4 and 5, the pivoting of the movable jaw 16a is only one of its two degrees of freedom since it is also able to rise relative to its pivot, here shown as a pivot pin 26. There will normally be spring biasing means, not shown, to hold the feet 28 of the movable body 27 supporting the jaw 16a so that it adopts the FIG. 3 position in which the central slot 27a of the body 27 is substantially vertical. In FIG. 4 the upper jaw 16a is shown as clamping the support web 4. The fixed jaw 16b is carried by the drive chain (not shown) for the clamps so that each of the fixed jaws 16b travels along the closed path for the clamps defined by the endless chains.

When, after leaving the thermoforming station, the clamps 16 on the drive chain arrive at the film covering station II, the feet 28 of the movable bodies 27 are lifted by engagement with the cam plate 17 (FIGS. 2 and 5) to allow relative movement facilitated by the slot 27a and the pivot pin 26 to lift the movable clamping jaw 16a and to move it laterally outwardly during pivoting of the body 27. This provides a wide access path through which the covering film 3 (FIG. 5) may move downwardly on to the support web 4 without fouling the movable clamping jaws 16a and may then rest with the margins of the covering film 3 substantially juxtaposed with the margins of the support web 4 before the clamp 16 in question rides off the end of the cam plate 17 and the spring biasing means (not shown) once more drives the movable jaw 16a down into clamping engagement with the films 3 and 4 on the fixed jaw 16b.

The use of a chain to grip a lower film and then to open to receive an upper film which it later grips together with the lower film, in accordance with the present invention, is particularly useful for VSP machines, but the arrangement is equally applicable to other thermoforming machines which are well known in the art, and are for example described in GB-A-1352478, DE-A-2322943, DE-A-2335021, DE-A-2430497, DE-A-2437124, DE-A-3400911, DE-A-3520499 and EP-A-0138172.

It will be appreciated that the use of a chain which is capable of opening to receive the second film and then of closing to clamp it is preferable, on the grounds of simplicity and cheapness, to one using a complex chain system in which the upper film is held by one chain and the lower film by another, with guidance to ensure that the films come into contact with one another. Such an arrangement does not readily allow for the films to contact one another in the same way as is achieved with the present invention.

What is claimed is:

1. A packaging apparatus comprising means for advancing a first film web along a path including in sequence (i) a loading station at which at least one product is placed on the first film web, (ii) a film covering station including means to supply a second film web which is placed over the first film web and over products(s) having been placed thereon at the loading station, and (iii) a packaging station at which the first and second film webs are sealed together to define a package with the product(s) loaded at the loading station enclosed within the pack; wherein said advancing means comprise: clamping means for gripping the margin s of said first film web and for entraining its advance through said loading station, said film covering station, and said packaging station; and means located at said film covering station for opening the jaws of said clamping means at said film covering station to release the margins of said first film web and to provide space for access of a said second film web to said clamping means; and including means for closing said jaws of the clamping means to hold said second film web in juxtaposition with said first film web by clamping of their margins as the clamping means advance from said film covering station.

2. Apparatus according to claim 1, wherein there is a thermoforming station upstream of said loading station, and wherein the clamping means are effective to grip the first film web before arrival at said thermoforming station and to drive it positively through said thermoforming station.

3. Apparatus according to claim 1 or claim 2, wherein said packaging station comprises a vacuum packaging station.

4. Apparatus according to claim 1 wherein said packaging station comprises a vacuum skin packaging means for forming the second film web as a skin tight covering of the at least one product and the first film web.

5. Apparatus according to claim 1 and including means for applying stretching tension to said first film web before arrival at said film covering station, and for maintaining said tension in the first film web until the instant of reclosing said clamps of the clamping means.

6. Apparatus according to claim 5, wherein said stretching means are effective to apply longitudinal tension to said second film upstream of said film covering station.

7. Apparatus according to claim 5 or 6, wherein said tension is applied to the second film web by braking a supply roll of the second film web against positive film advancing action of said clamping means.

8. Apparatus according to claim 5 and including a dancer roll movable perpendicular to the general path of advance of said second film web for controlling the longitudinal stretching tension applied thereto.

9. Apparatus according to claim 5 and including an endless chain of said clamping means to advance the first film web along the apparatus while clamped by said clamping means; and cam means at said film covering station and re-closing said clamping means.

* * * * *